(12) United States Patent
Palmer (10) Patent No.: US 7,425,014 B1
(45) Date of Patent: Sep. 16, 2008

(54) TRAILER HITCH

(76) Inventor: Van Bradford Palmer, 7310 Hwy. 301 North, Lot 34, Ellenton, FL (US) 34222

( * ) Notice: Subject to any disclaimer, the term of this patent is extended or adjusted under 35 U.S.C. 154(b) by 0 days.

(21) Appl. No.: 11/891,739

(22) Filed: Aug. 13, 2007

(51) Int. Cl.
*B60D 1/36* (2006.01)
*B60D 1/40* (2006.01)
*B60D 1/44* (2006.01)

(52) U.S. Cl. .................. 280/479.3; 280/477; 280/478.1; 280/479.2

(58) Field of Classification Search ............... 280/477, 280/478.1, 479.2, 479.3
See application file for complete search history.

(56) References Cited

U.S. PATENT DOCUMENTS

| | | | |
|---|---|---|---|
| 3,169,028 A | 2/1965 | Scrivner | |
| 3,266,818 A * | 8/1966 | Hill et al. .................. | 280/479.3 |
| 3,774,943 A * | 11/1973 | Schmiesing ................ | 172/677 |
| 3,860,267 A * | 1/1975 | Lyons ..................... | 280/479.3 |
| 3,912,119 A * | 10/1975 | Hill et al. ................. | 280/479.2 |
| 3,989,270 A | 11/1976 | Henderson | |
| 4,176,854 A | 12/1979 | Hill et al. | |
| 4,178,011 A * | 12/1979 | Kirsch ....................... | 280/477 |
| 4,515,387 A | 5/1985 | Schuck | |
| 4,773,667 A | 9/1988 | Elkins | |
| 4,951,957 A | 8/1990 | Gullickson | |
| 4,991,865 A | 2/1991 | Francisco | |
| 5,009,446 A | 4/1991 | Davis | |
| 5,011,176 A | 4/1991 | Eppinette | |
| D317,426 S * | 6/1991 | Lytle ........................ | D12/162 |
| 5,067,742 A | 11/1991 | Relja | |
| 5,593,171 A | 1/1997 | Shields | |
| 5,630,606 A * | 5/1997 | Ryan ....................... | 280/479.3 |
| 6,328,326 B1 * | 12/2001 | Slatten .................... | 280/479.3 |
| 2007/0080516 A1* | 4/2007 | Simmons ................. | 280/479.3 |

FOREIGN PATENT DOCUMENTS

GB       2278586 A * 12/1994

* cited by examiner

*Primary Examiner*—Lesley D. Morris
*Assistant Examiner*—Daniel Yeagley
(74) *Attorney, Agent, or Firm*—Charles J. Prescott (57) ABSTRACT

A trailer hitch facilitating proper alignment and connection to the hitch coupler of a trailer. The trailer hitch includes a tow bar assembly and a throat having spaced parallel top and floor panels generally equal in spacing to a vertical thickness of the tow bar and rearwardly diverging side panels. The front of the throat is connected or connectable to an elongated tubular extension or receiver and is sized to be slidably carried within the throat assembly. A slide bar is carried between the tow bar and the throat and includes a stop which limits the distance the tow bar may be extended rearwardly from the throat and, when in the fully or a partially extended position, is movable side-to-side to facilitate proper coupling alignment between the hitch ball and a hitch coupling of a trailer.

6 Claims, 13 Drawing Sheets

TRAILER HITCH

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to variable range towing hitches for pulling a trailer behind a towing vehicle and more particularly to an improved wide range towing hitch which presents a compact, full function, wide range trailer hitch which facilitates coupling the trailer to the trailer hitch ball over a broad range of misaligned orientations of the respective vehicles.

2. Description of Related Art

A number of wide range towing hitches are known and described in prior patents which facilitate tow vehicle-to-trailer tongue connection even when there is misalignment without the need to jockey the tow vehicle or the tongue of the trailer.

U.S. Pat. No. 4,991,865 to Francisco teaches a trailer hitch which is extendable in length, having at least two telescoping members, the hitch lockable at a 90° angle. Scrivner teaches a trailer hitch which may be released for free movement both laterally and longitudinally in U.S. Pat. No. 3,169,028.

A connection-facilitating hitch is taught in U.S. Pat. No. 4,176,854 to Hill, et al., an object of which is a hitch characterized by a pivotal coupling arm and mechanism for capturing and supporting the arm. U.S. Pat. No. 4,951,957 to Gullickson discloses a wide-range hitch including a receiver tube mounted for pivotal movement within the interior of the housing.

Ryan discloses a trailer hitch with a telescoping member capable of lateral swing movement in U.S. Pat. No. 5,630,606 and Eppinette teaches an adjustable trailer coupling including a telescoping arm pivotally connected to an articulating arm in U.S. Pat. No. 5,011,176. A quick hitch coupling apparatus with the tow bar pivotally and releasably connected to the hitch sleeve is taught in U.S. Pat. No. 5,067,742 to Relja.

U.S. Pat. No. 3,989,270 to Henderson discloses an extensible and retractable split hitch offering versatility in aligning the hitch with the ball of a towing vehicle and U.S. Pat. No. 4,515,387 to Schuck teaches a hitch with a swiveling tongue. A proximity hitch which is retrofitable is disclosed in U.S. Pat. No. 4,773,667 to Elkins and Davis teaches a self-aligning coupling apparatus in U.S. Pat. No. 5,009,446. Shields discloses a trailer hitch for facilitating hitching of a trailer to a towing vehicle is taught by U.S. Pat. No. 5,593,171.

The foregoing examples of the related art and limitations related therewith are intended to be illustrative and not exclusive. Other limitations of the related art will become apparent to those skilled in the art upon a reading of the specification and a study of the drawings.

The present invention provides a trailer hitch having a variable length and lateral adjustability which will accommodate trailer to tow vehicle misalignment over a broad range of lateral and fore-and-aft misalignments and, once coupled together, will self align one to another as the towing vehicle is backed rearwardly toward the trailer. In one embodiment, an automatic reengagement hatch is provided to establish the design retraction point, after which a locking pin secures the towing position of the trailer hitch itself.

BRIEF SUMMARY OF THE INVENTION

This invention is directed to a trailer hitch facilitating proper alignment and connection to the hitch coupler of a trailer. The trailer hitch includes a tow bar assembly and a throat having spaced parallel top and floor panels generally equal in spacing to a vertical thickness of said tow bar and rearwardly diverging side panels. The front of the throat is connected or connectable to an elongated tubular extension or receiver and is sized to be slidably carried within the throat assembly. A slide bar is carried between the tow bar and the throat and includes a stop which limits the distance the tow bar may be extended rearwardly from the throat and, when in the fully or a partially extended position, is movable side-to-side to facilitate proper coupling alignment between the hitch ball and a hitch coupling of a trailer.

It is therefore an object of this invention to provide a trailer hitch arrangement which accommodates misalignment between the hitch ball connected to the rear distal end of the trailer hitch and the hitch coupler attached to the forwardly distal end of the trailer.

Yet another object of this invention is to maximize similarities between conventional trailer hitches and that of the embodiments of the present invention.

Still another object of this invention is to provide in one aspect thereof a trailer hitch which readily adapts to and affords benefits for existing trailer hitch receivers permanently attached to a tow vehicle.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference of the drawings and by study of the following descriptions.

Exemplary embodiments are illustrated in reference figures of the drawings. It is intended that the embodiments and figures disclosed herein are to be considered to illustrative rather than limiting.

DETAILED DESCRIPTION OF THE INVENTION

Referring now to the drawings, and firstly to FIGS. 1 to 9, one embodiment of the invention is there shown in the various figures at numeral 10. This trailer hitch 10 includes a tow bar assembly 12 and a throat assembly 14. The tow bar assembly 12 includes an elongated tubular tow bar 16 of rectangular section having inwardly tapered side surfaces or panels 18 at a proximal end thereof which function as described herebelow. At the other or rearward end of the elongated tow bar 16 which preferably is square in cross section, is a tow bar riser 20 formed of solid metal which is arcuately bent to terminate at a generally horizontal hitch ball support 22 having a central aperture formed therethrough which lockably supports a conventional hitch ball 24 and locking nut The throat assembly 14, also formed of metal plate material, includes a throat 32 with outwardly divergent side panels and parallel spaced top and bottom panels which are generally spaced apart the height or thickness of the tow bar 16. The rearward distal margins of the throat 32 are open to define an elongated generally rectangular opening leading to a hollow interior of the throat 32 which may in one aspect be described as a frustro-pyramid-shaped cavity.

This embodiment 10 is adapted to be permanently attached to an existing conventional tubular receiver R already attached to the rear of the tow vehicle V as best seen in FIG. 4 through 8. The receiver R is typically connected to a central portion of a conventional trailer hitch shown schematically at C in FIG. 3 which, in turn, is permanently connected or attached by fasteners to the frame F at the rear of a tow vehicle V. The receiver R typically receives a conventional straight tow bar which slidably engages thereinto and is pin-connected by a conventional locking pin similar to that shown at 42 which passes through aligned holes in the receiver R and the conventional tow bar (not shown) and is held in place by a conventional retainer clip similar to that shown at 44.

However, in this embodiment 10, the throat 32 of the throat assembly 14 is positioned against the rearwardly facing opening of the receiver R, proper alignment and strength being aided by an additional alignment plate 38 having a notch 40 formed therein which mates over the existing enlargement or strenghtening flange A formed around the distal opening of the receiver R. Once the throat assembly 14 is positioned as shown in phantom, weldments at 48, 52 and 54 are made which permanently secure the throat assembly 14 to the receiver R.

The tubular tow bar 16 is adapted for loose slidable engagement into the receiver R in a conventional fitting way with respect to trailer hitches generally. The tow bar 16 is also lockable in the in-use ready to tow position by locking pin 42 which slidably engages through mating apertures E and 56 formed through the side panels of receiver R and side panels of throat 32, respectively, as best seen in FIGS. 7 and 8.

Figures 7, 8:
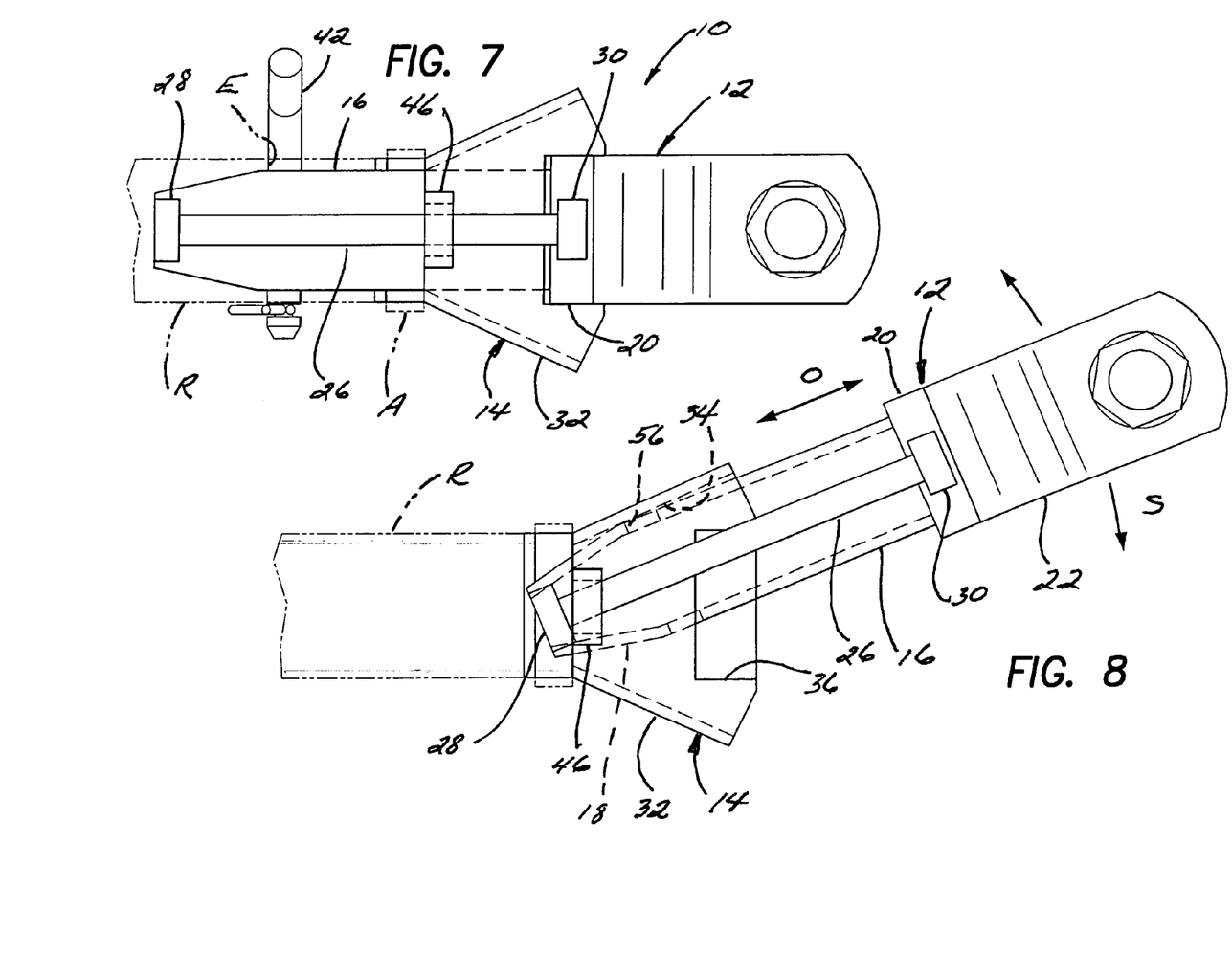
FIG. 7 is a bottom plan view of FIG. 1.
FIG. 8 is a view of FIG. 7 showing the tow bar assembly in a fully extended and laterally pivoted position.
Figure 9:
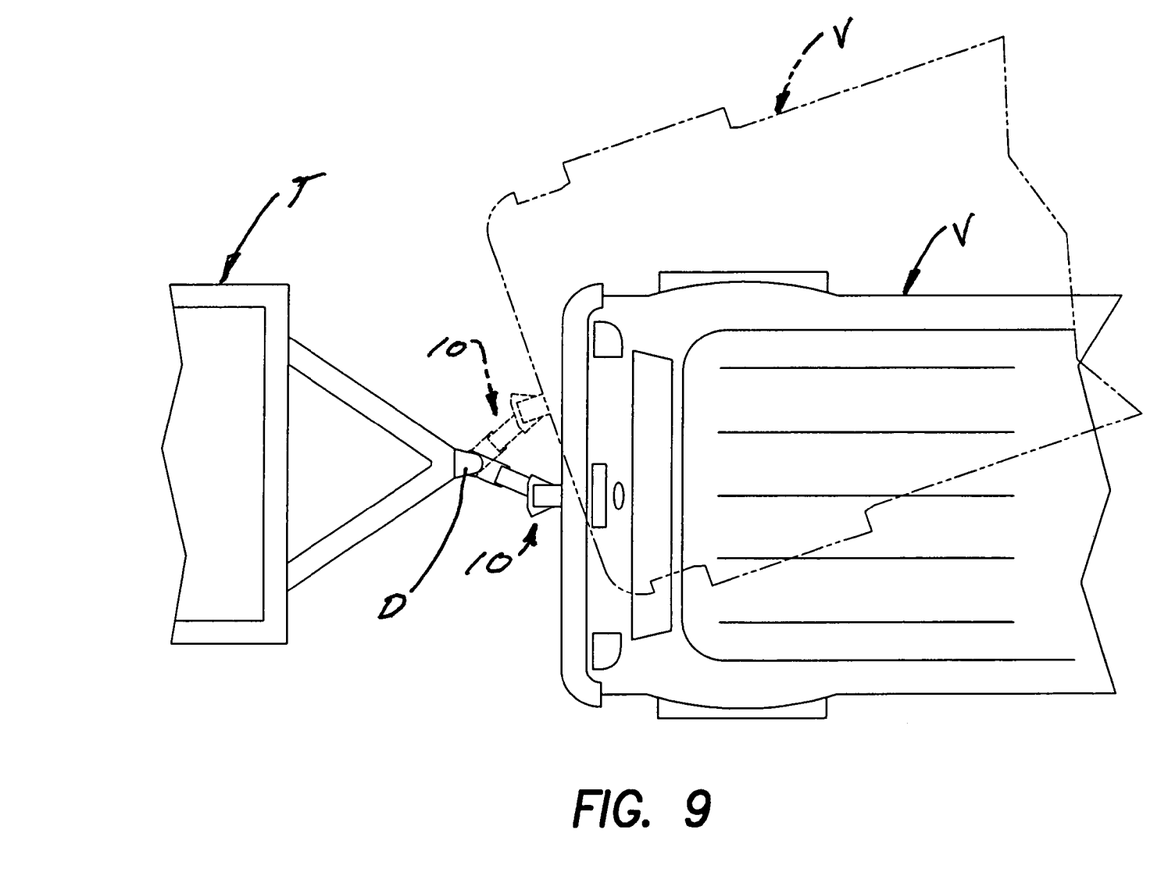
FIG. 9 is a top plan schematic view of the invention of FIG. 1 in relation to scenarios of misalignment between a tow vehicle V and a trailer T.
Figure 10:
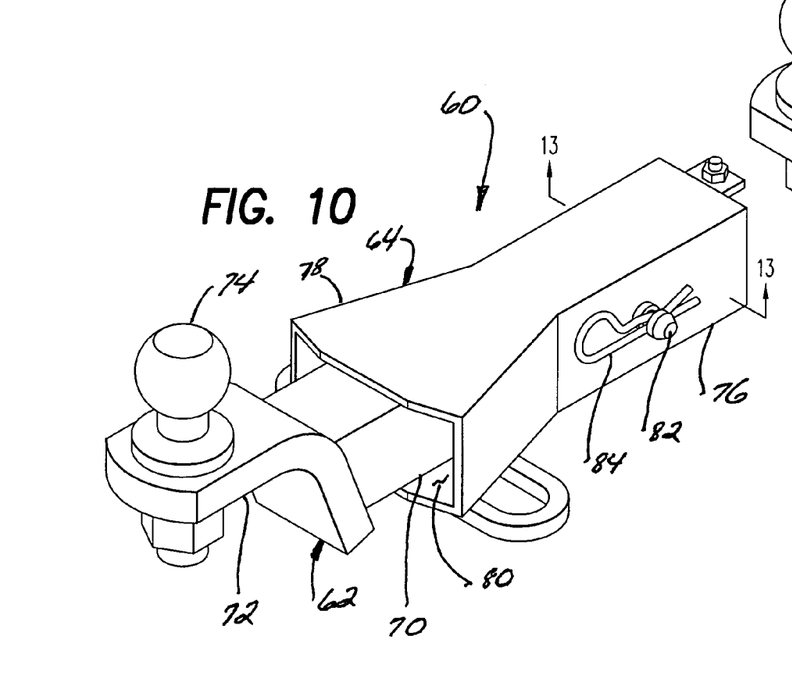
FIG. 10 is a rear perspective view of another embodiment including a throat extension thereof acting as a tow bar receiver.
Figure 17:
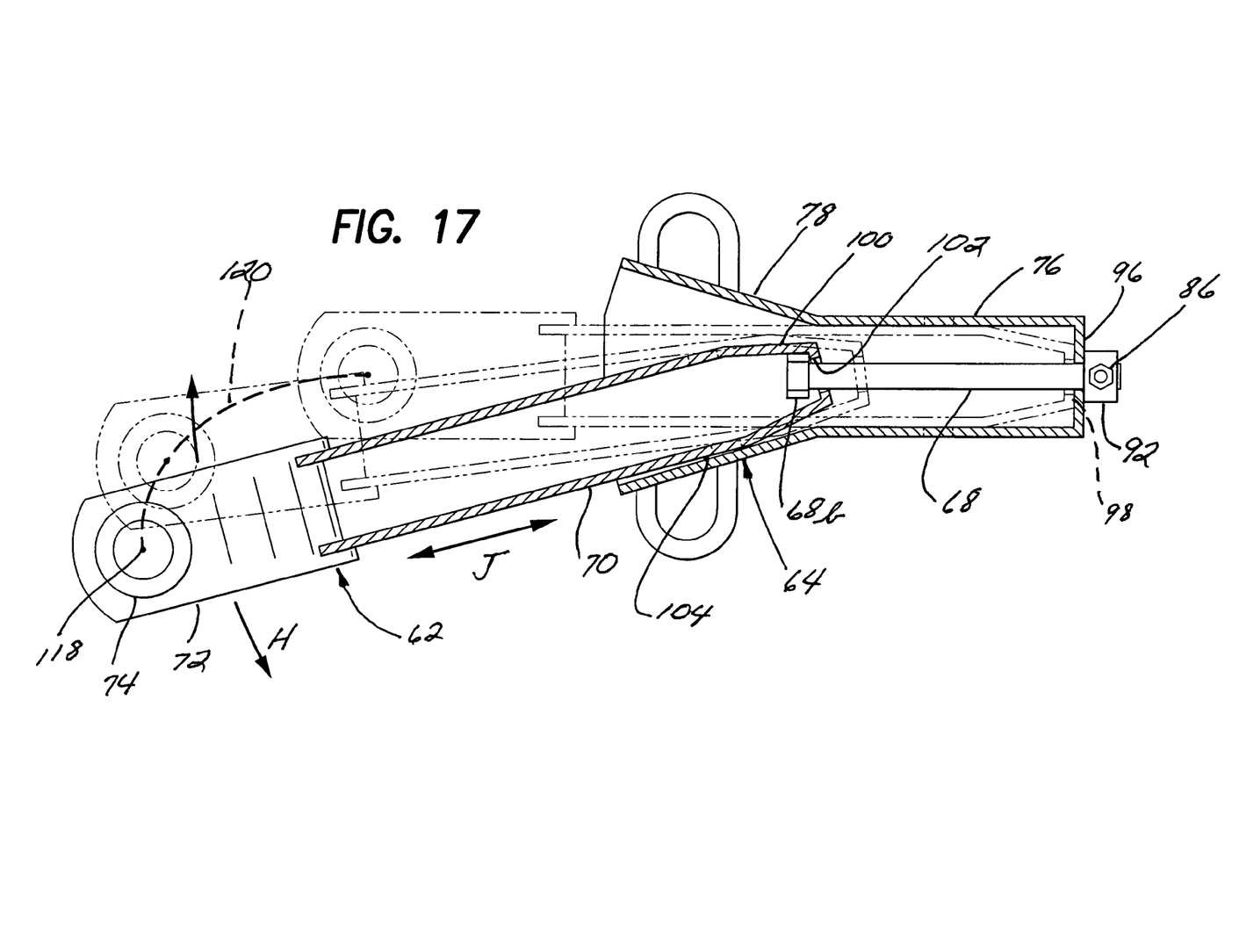
FIG. 17 is a view of FIG. 16 showing the range of rearward and lateral articulation of the tow bar assembly to effect trailer connection.

However, when the hitch coupler D best seen in FIG. 9 is misaligned with the hitch ball 24, the locking pin 42 may be removed and the tow bar assembly 12 rearwardly extended as seen in FIGS. 8, 9 and 17 (described in more detail herebelow). The hitch ball 24 may then be properly articulated beneath the hitch coupler C whereupon a conventional trailer tongue jack (not shown) may be utilized to lower the tongue of the trailer T along with the hitch coupler D down over the hitch ball 24, the alignment of which may be easily readjusted as the hitch coupler is lowered over the hitch ball 24.

Once the hitch ball 24 and the hitch coupler D are properly engaged together, the tow vehicle V may be backed up in the inward direction of arrow O whereupon the sides of the tow bar 16 may contact against the inner side surfaces of the side panels 34 of the throat 32, the trailer being forced to laterally move into longitudinal alignment with the receiver R and the trailer hitch 10. Along the way, the tapered side panels 18 may make contact with the side surfaces of the receiver R to help force this axial alignment between the receiver R and the tow bar assembly 16 and the trailer tongue of the trailer T itself.

Figures 1, 2:
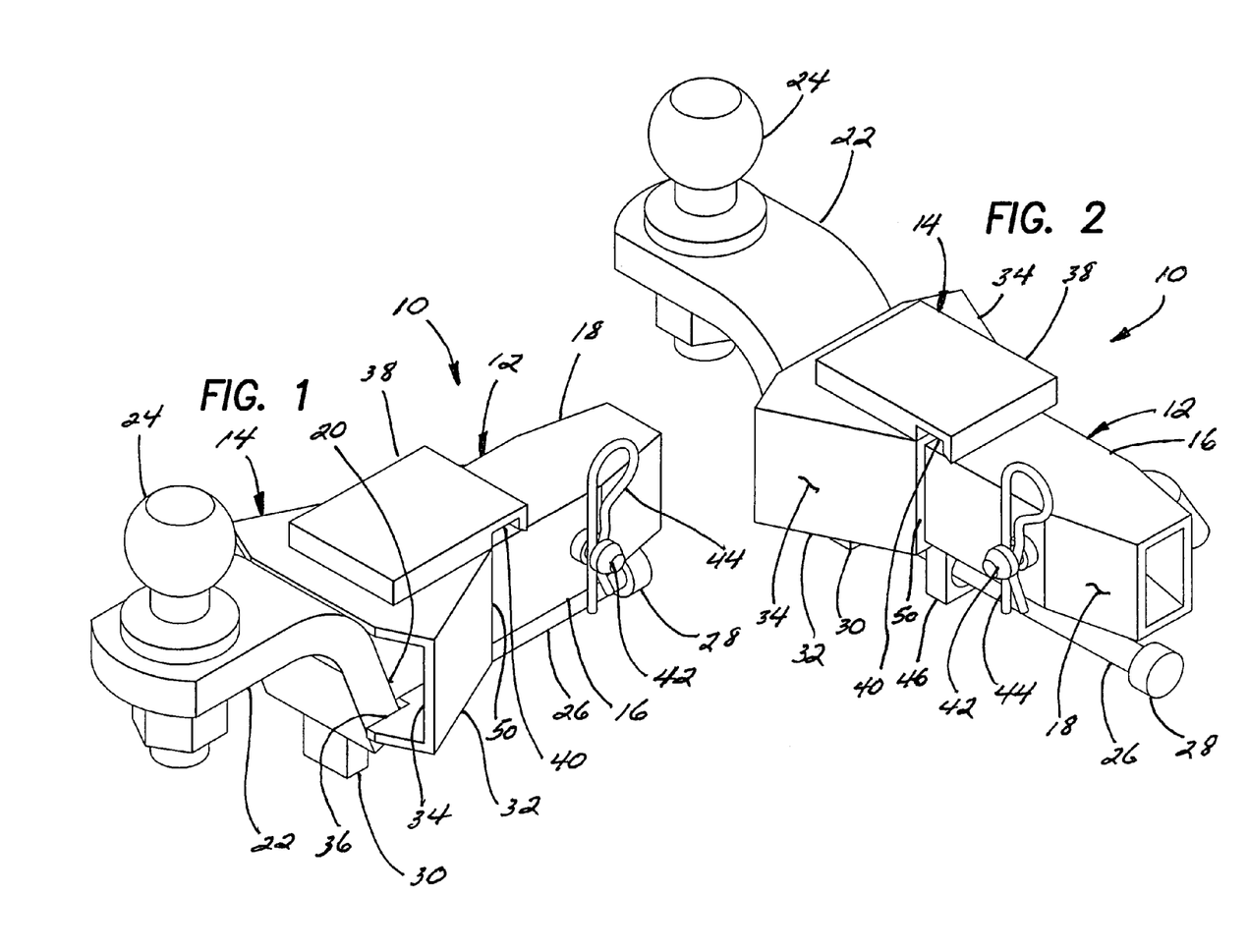
FIG. 1 is a rear perspective view of one embodiment, the throat assembly of which is permanently attachable to an existing tubular receiver connected to the rear of the tow vehicle.
FIG. 2 is a front perspective view of FIG. 1.
Figure 3:
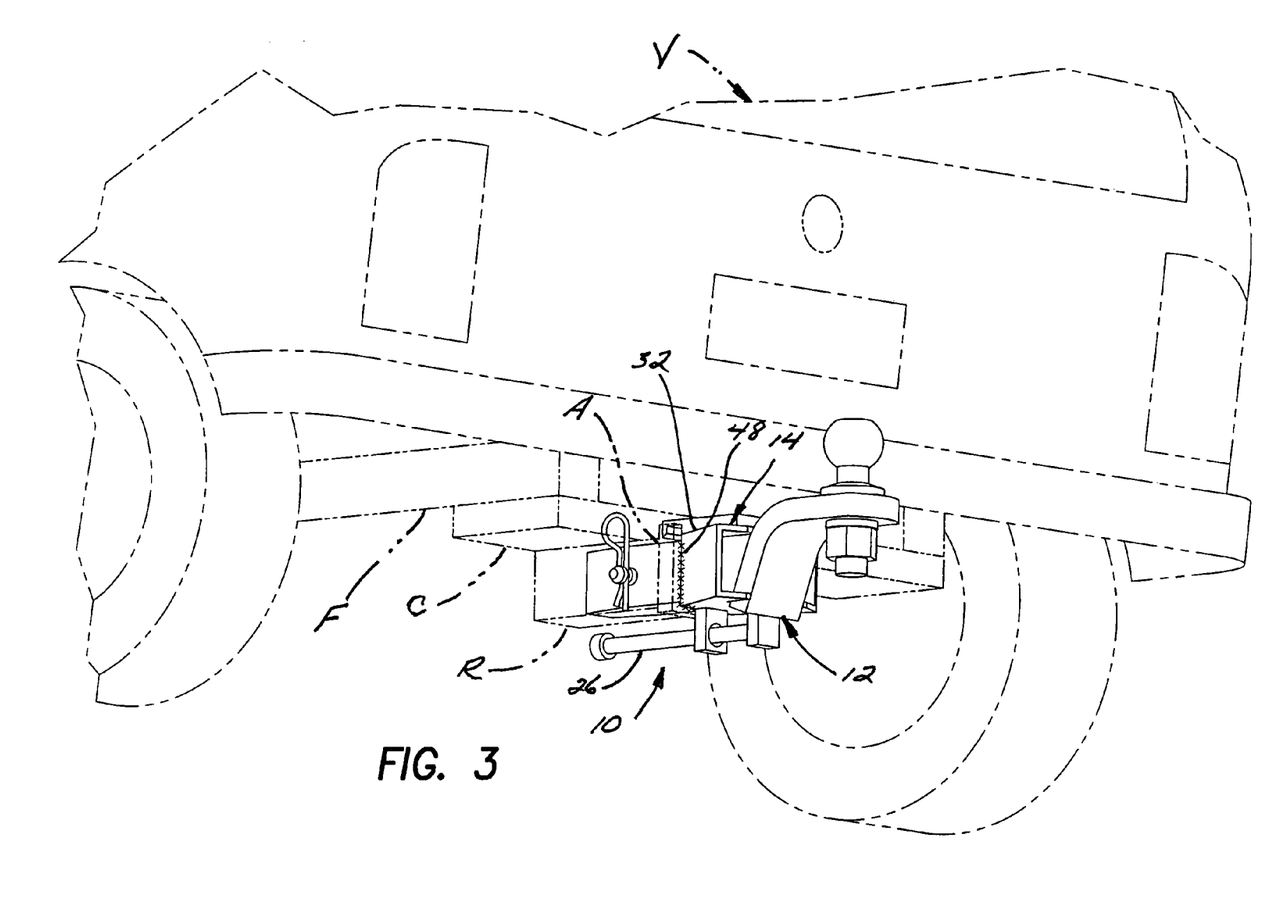
FIG. 3 is another rear perspective view of FIG. 1 attached to the receiver of a tow vehicle, the tow vehicle being shown in phantom.
Figure 4:
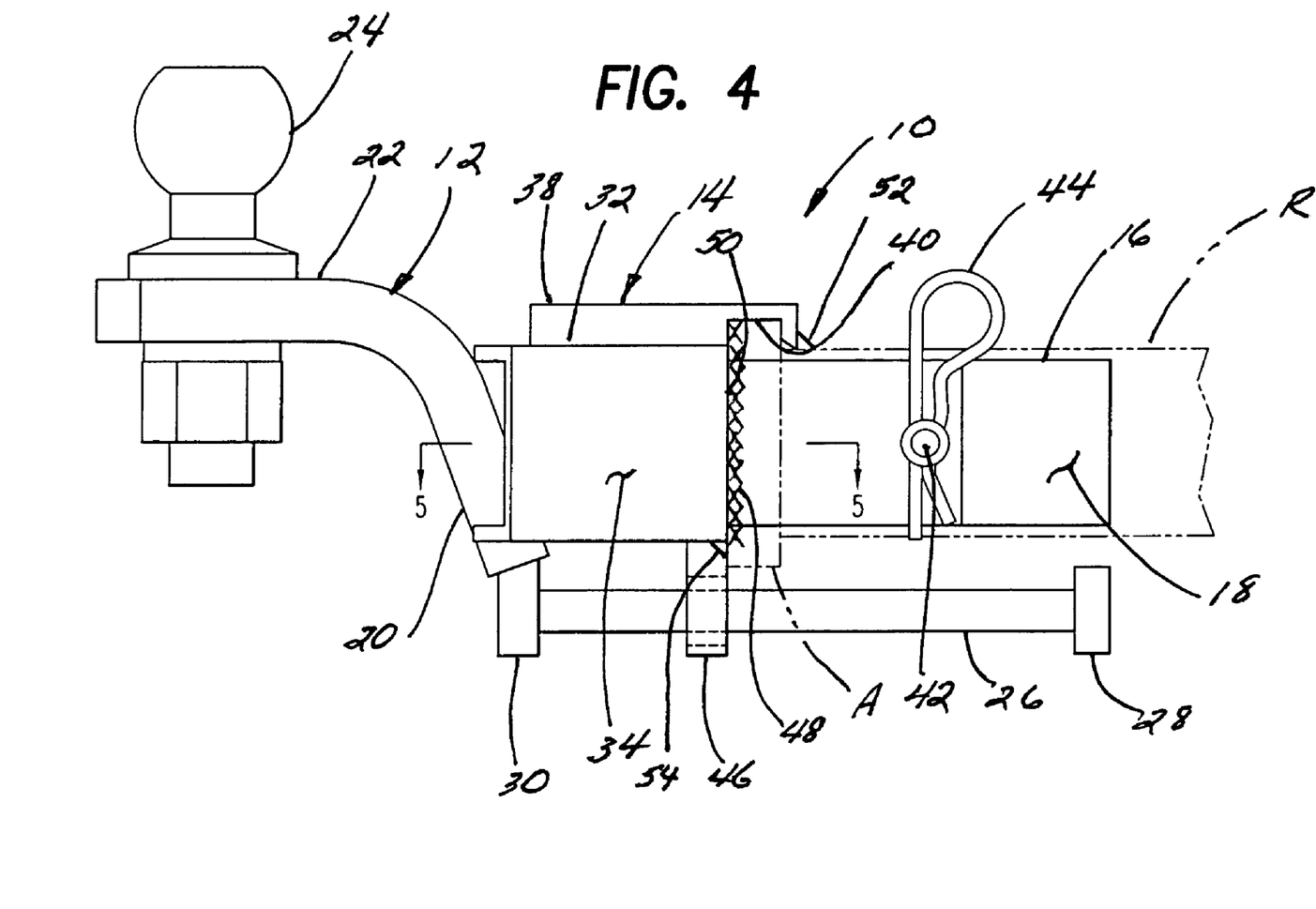
FIG. 4 is a side elevation view of FIG. 1.
Figure 5:
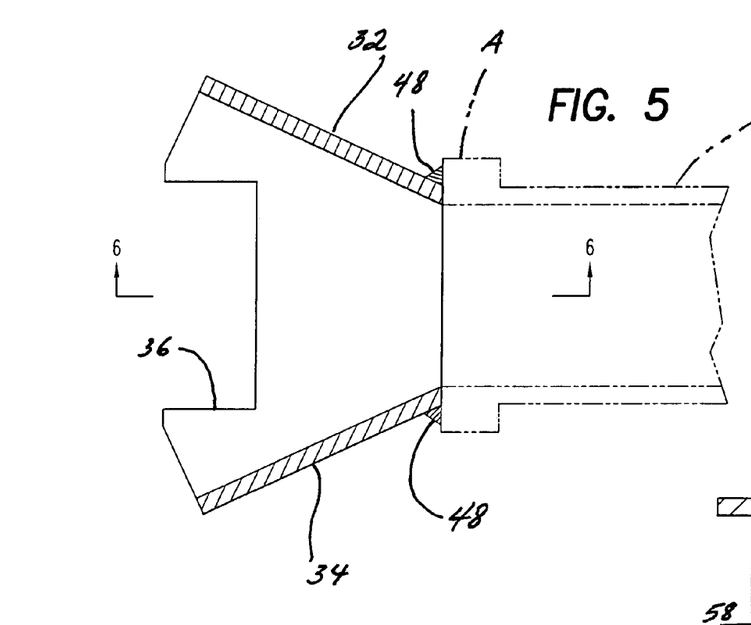
FIG. 5 is a section view in the direction of arrows 5-5 in FIG. 4.
Figure 6:
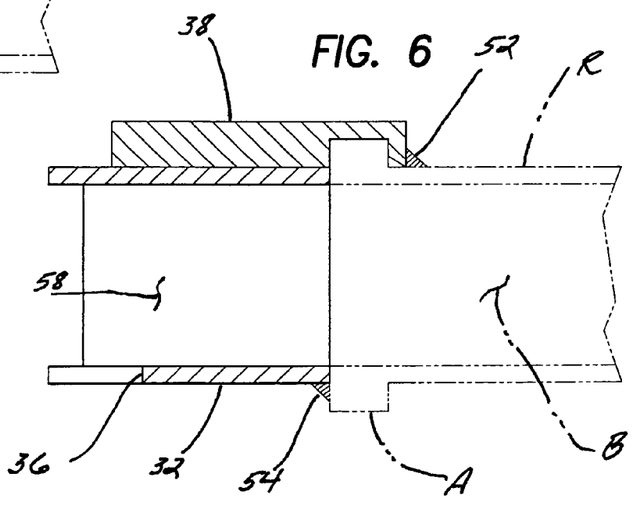
FIG. 6 is a section view in the direction of arrows 6-6 in FIG. 5.

Once the throat assembly 14 is fully reengaged as assisted in alignment and strengthened in its lateral positioning by notch 36 which matably engages against the side surfaces of the tow bar riser 20 as best seen in FIG. 1, the locking pin 42 may be reengaged through the aligned apertures E and 56 of the receiver R and tow bar 16, respectively.

Importantly, to avoid improper rearward withdrawal of the tow bar assembly 12 from the throat assembly 14, an elongated slide bar 26 is also provided in this embodiment 10. This slide bar 26 is rigidly connected at mounting block 30 to the lower forwardly end of the tow bar riser 20 and extends along the longitudinal axis of the tow bar assembly 12 slidably engaged through a guide/stop 46 which is rigidly connected to the bottom 58 of the throat 32. Thus, as best seen in FIG. 8, when the tow bar assembly 12 is fully extended in the direction of arrow O, the enlarged end 28 of the slide bar 26 abuts against the guide/stop 46 preventing further rearward extension of the tow bar assembly 12. Note that the lateral pivotal movement in the direction of arrow S of the tow bar assembly 12 does not interfere with the stop function between the enlarged slide bar end 28 and the guide/stop 46 as the aperture formed through the guide/stop 46 is sufficiently large to accommodate the misalignment depicted in FIG. 8.

Also note that the forwardly edge of the tow bar notch 36 abuts against the forwardly facing surface of the tow bar riser 20 to prevent excessive inward movement assures and proper in-use positioning of the tow bar assembly 12 in the pinned and locked position shown in FIGS. 1 to 7.

Referring now to FIGS. 10 to 17, an alternate embodiment or aspect is there shown generally at numeral 60 and includes a tow bar assembly 62 and a throat assembly 64. The tow bar assembly 62 is similar to that described in the previous embodiment 10 and includes an elongated tubular tow bar 70 having inwardly tapered sides 100 and an end plate 98 at the forwardly proximal end thereof. A solid formed metal hitch ball support 72 which carries a conventional hitch ball 74 thereon as shown, is rigidly connected to the rearward distal end of the tow bar 70 in a longitudinally aligned arrangement.

The throat assembly 64 includes a throat 78 fabricated or formed of plate metal material having a floor 80 and opening divergently rearwardly to define an elongated rectangular rear opening to receive the tow bar 70 and its lateral articulation as shown in FIG. 17 when rearwardly extended to facilitate proper trailer coupling alignment. This throat assembly 64 also includes a throat extension 76 formed as a unit with the throat 78 having a uniform tubular cross section for loosely slidably receiving the tow bar 70 in a fashion hereabove described with respect to the tow bar 70 and receiver described in the embodiment 10.

Figure 12:
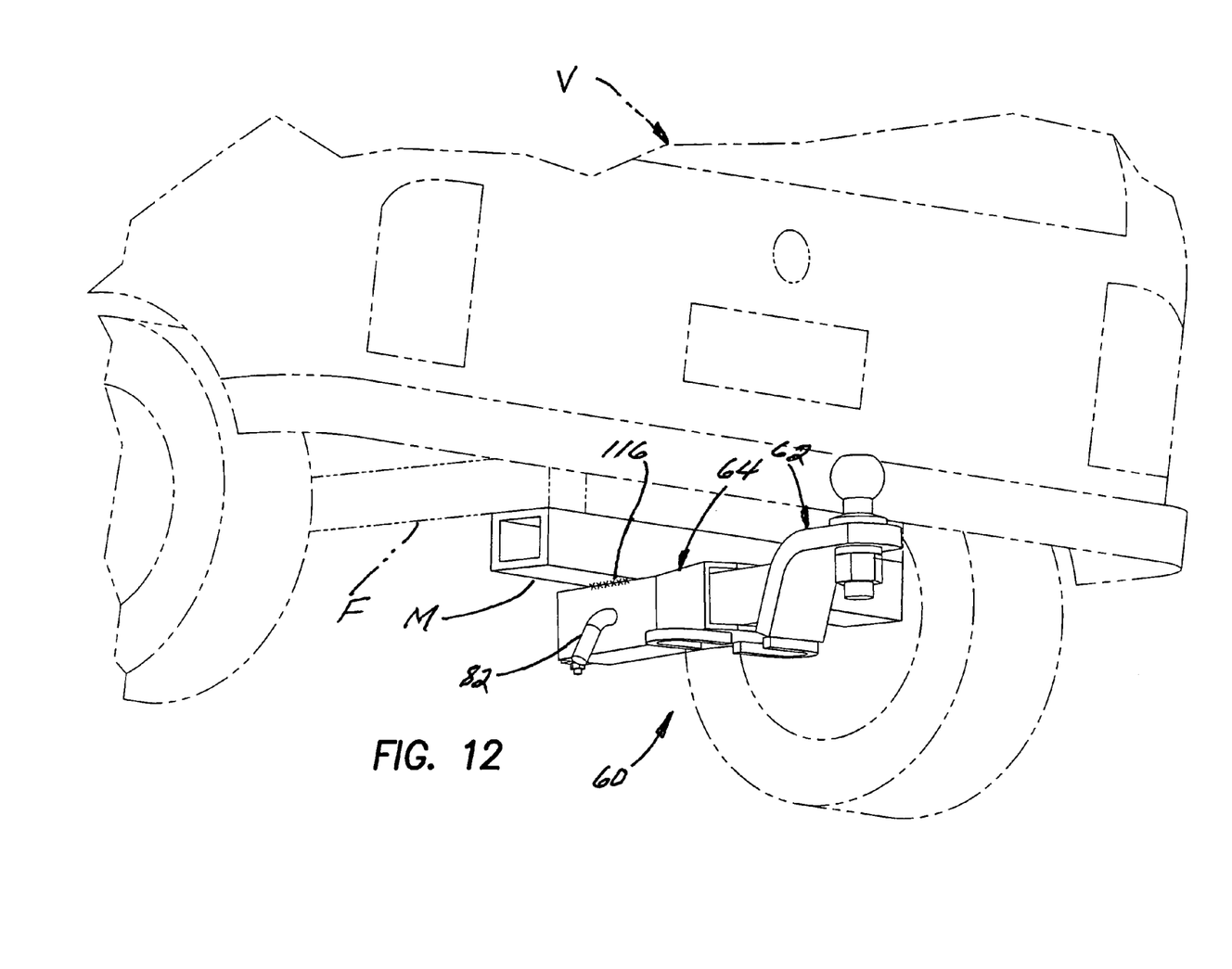
FIG. 12 is another rear perspective view of FIG. 10 attached to a rear frame cross member of the tow vehicle shown in phantom.
Figure 13:
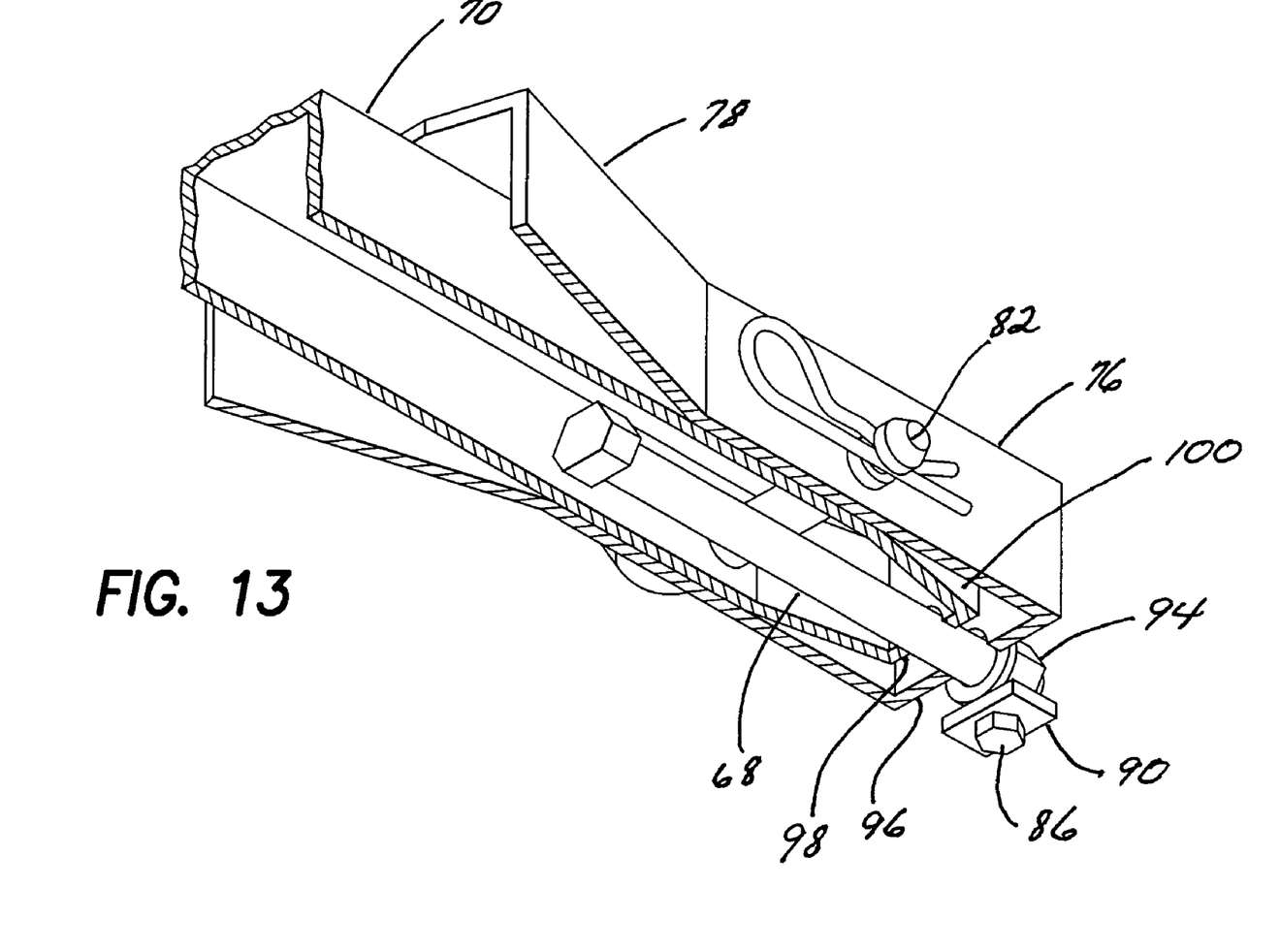
FIG. 13 is a rear lower perspective section view in the direction of arrows 13-13 in FIG. 10.

As best seen in FIG. 12, this embodiment 60 is rigidly attached by weldments 116 to the rear frame cross member-M which is turn is rigidly or mechanically attached to the frame F of the tow vehicle V. When the tow bar assembly 62 is fully engaged into the throat assembly 64, the locking pin 82 is slidably engaged through aligned apertures formed through the sides of the tow bar 70 and the throat extension 76 to lockably affix the tow bar assembly 62 fully engaged into the throat assembly 64 for normal towing activity. However, as best seen in FIG. 17, when the locking pin 82 is removed, the tow bar assembly 62 may be rearwardly withdrawn any suitable adjustable amount up to the positioning of the tow bar assembly 62 shown in solid lines in this figure. The locus or track of the upright axis 118 of the hitch ball 74 is approximately depicted in the dashed lines at 120 as the tow bar assembly 62 is withdrawn in the direction of arrow J and arcuately articulated in the direction of arrow H. The limiting factor of movement rearwardly of the tow bar assembly 62 is controlled generally by the contact of the tapered surfaces 100 against the inner side wall surfaces of the throat extension 76 and against the side surfaces of the throat 78 as typically shown at contact or stop surface 104. Thus, as with the previous embodiment 10, the hitch ball 74 is rearwardly positionable over broad range both rearwardly and arcuately side-to-side with respect to the longitudinal axis of the throat assembly 64 to accommodate misalignment between the hitch ball 74 and the hitch coupler D.

Figure 16:
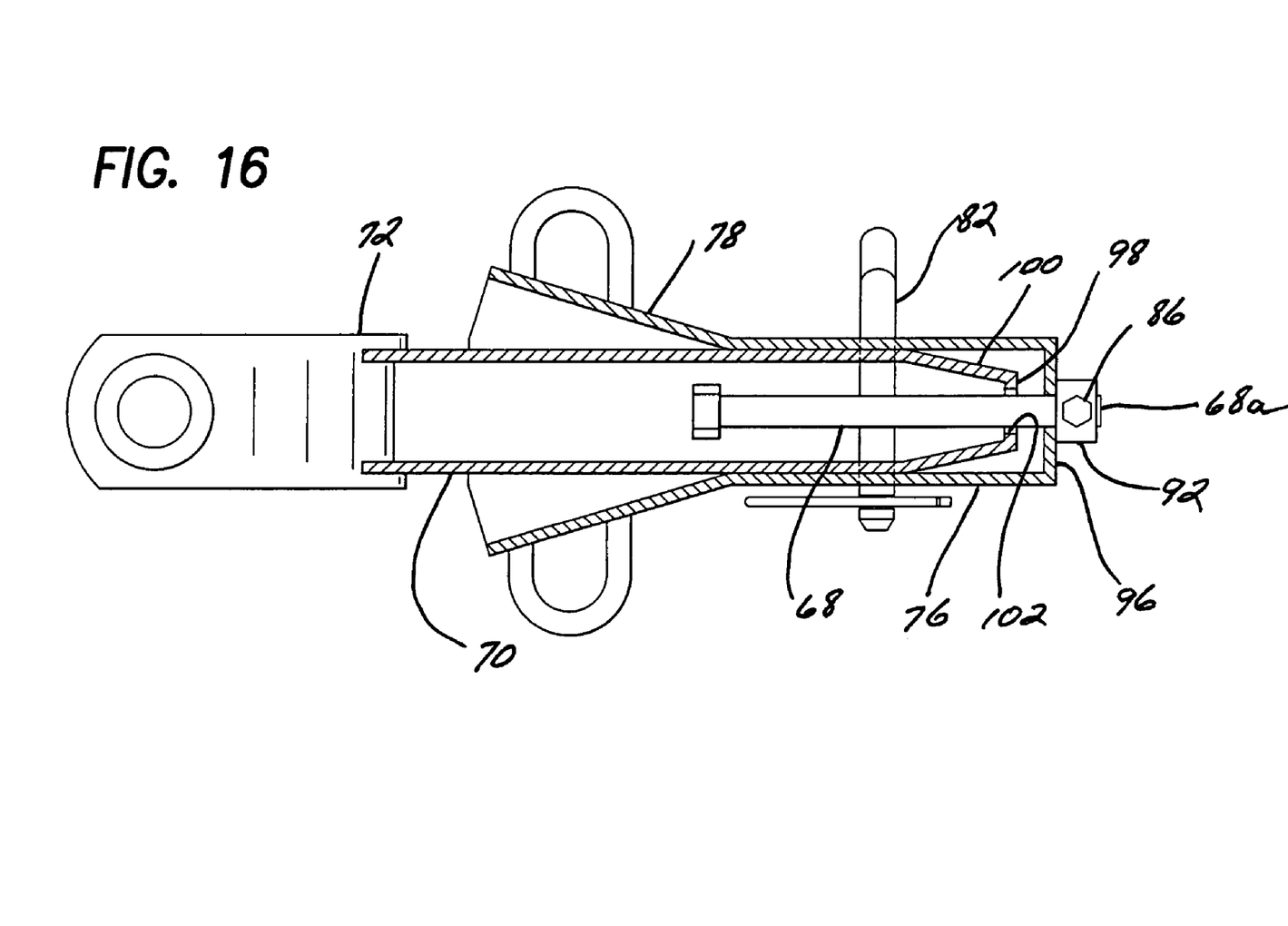
FIG. 16 is a section view in the direction of arrows 16-16 in FIG. 14.

To prevent excessive rearward withdrawal of the tow bar assembly 62 from supportive engagement from the throat assembly 64, an elongated slide bar 68 is also provided. In this embodiment 60, the slide bar 68 is positioned and extends longitudinally within the tow bar 70 when the tow bar assembly 64 is fully engaged in the in-use position as best seen in FIG. 16. However, when the tow bar assembly 62 is withdrawn rearwardly in the direction of arrow J, the slide bar 68, slidably engaged through loosely aligned aperture 102 formed into the tow bar end plate 98, slidably engages along the length of the slide bar 68 until coming in contact with the enlarged end 68b of the slide bar 68.

Figure 11:
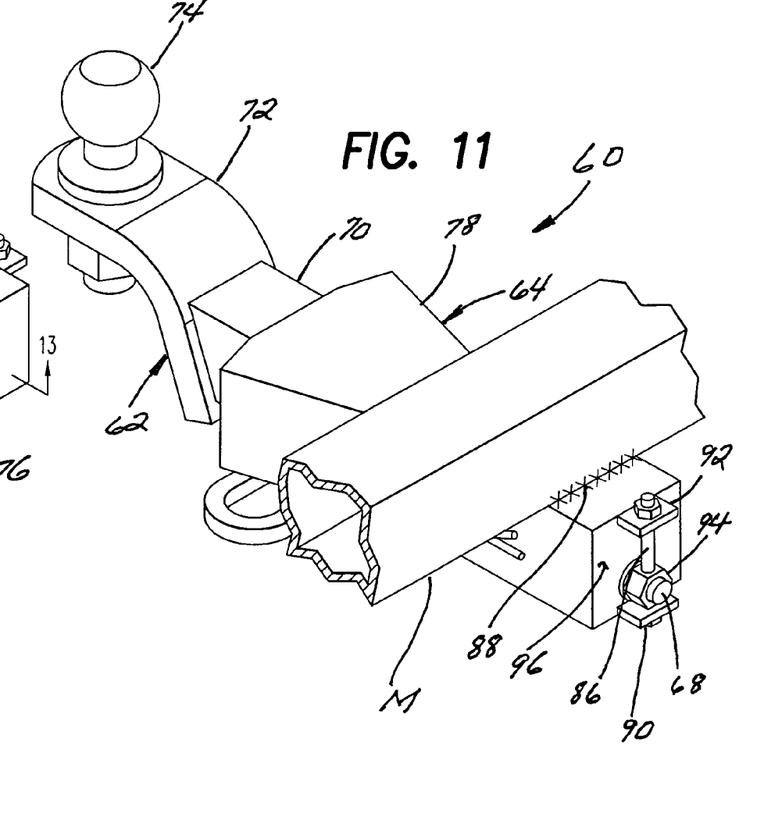
FIG. 11 is a front perspective view of FIG. 10 additionally showing the throat assembly permanently attached to a rear frame cross member of the tow vehicle.
Figure 14:
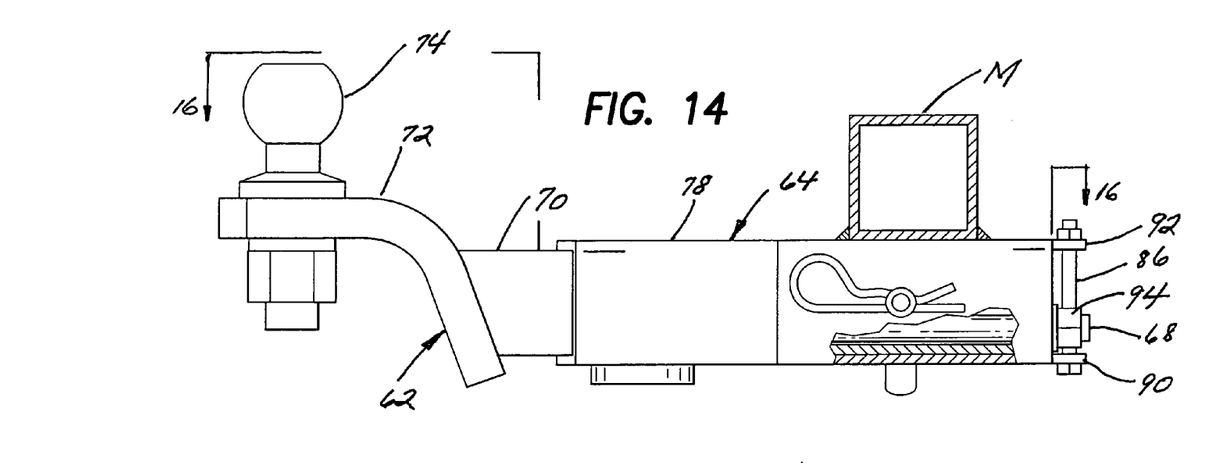
FIG. 14 is a side elevation view of FIG. 11.
Figure 15:
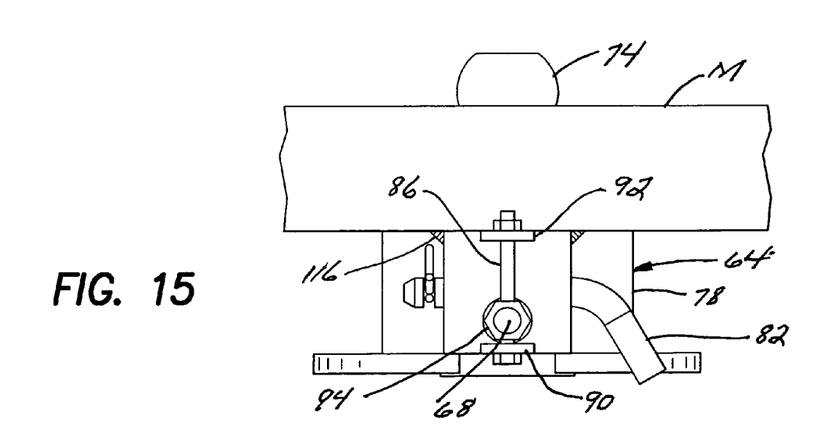
FIG. 15 is a front elevation view of FIG. 11.

The opposite or forwardly end of the slide bar 68 is threadably engaged into locking nut 94, the two being supported through an aligned aperture formed transversely therethrough through which an elongated bolt 86 is engaged. Each end of the bolt 86 is carried through aligned apertures formed through tabs 92 which are securely attached and in longitudinal alignment with, the upper and lower surfaces of the throat extension 76 as best seen in FIGS. 11 and 14. By this arrangement, the slide bar 68 is rigidly but releasably secured and may be easily assembled into the tow bar 70 and the throat extension 76.

Note that the tow bar end plate 98 serves an additional function, that being an end stop for inward movement of the tow bar assembly 62 against the throat end plate 96 as the tow vehicle is backed up after the hitch ball 74 has been properly aligned to and coupled with the hitch coupler D previously described. Thus, should the tow vehicle V be inadvertently backed up too far, the contact between the tow bar end plate 98 against the inner surface of the throat end plate 96 will prevent any damage therebetween.

Figure 18:
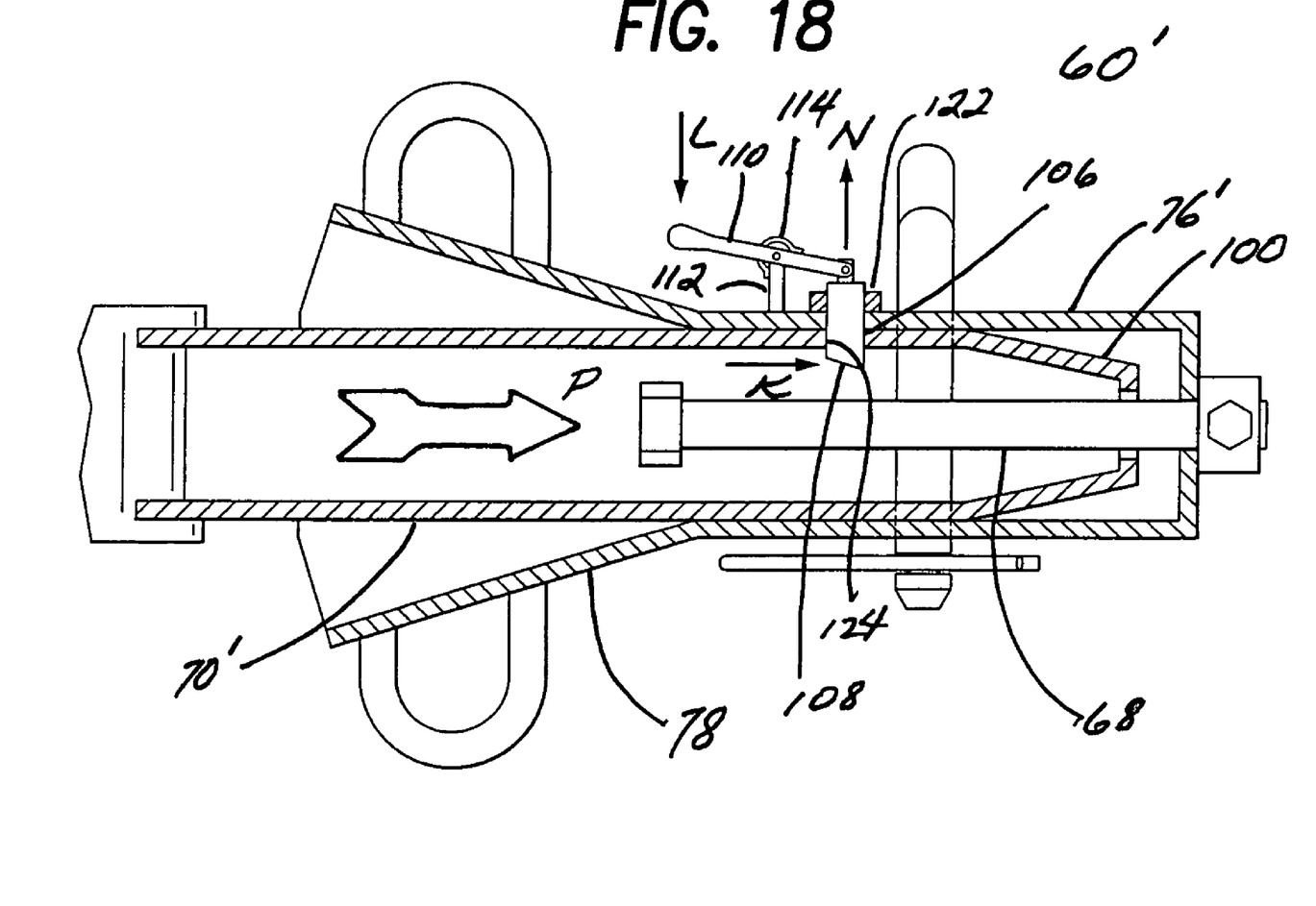
FIG. 18 is a view similar to FIG. 16 depicting an additional self-locking feature.

Referring lastly to FIG. 18, an alternate means for preventing excess movement of the tow bar 70 into the throat extension 76' in the direction of arrow P is there shown. A spring latch 106 having a rearwardly facing tapered end 108 is biasingly engaged within a latch support 122 which is rigidly secured against the side surface of the tubular extension 76' as shown. A spring biased pivotally connected latch release 110, which is movable inwardly in the direction of arrow L, causes the latch 106 to be moved in the direction of arrow N. The latch release 110 and torsion spring 114 are supported on support 112 which is also rigidly connected to the side of the tubular extension 176.

In operation, the tapered side surface 100 of the tow bar 70' strikes the tapered end 108 of the latch 106 driving it outwardly in the direction of arrow N until it engages through a mating hole 124 formed in the side of the tow bar 70'. Thereupon, the latch 106 will pop into this aperture 124 and serve as a positive trailering positioner of the tow bar 70' after which the locking pin 82 will be inserted through the aligned apertures in the throat extension 76' and the tow bar 70' for full towing strength.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A trailer hitch comprising:
   a tow bar assembly including an elongated tow bar rectangular in cross section and a hitch ball support disposed at a rearwardly end thereof, said tow bar also having straight side panels which taper inwardly in the longitudinal direction at a forwardly end thereof;
   a throat assembly including a throat having spaced parallel top and floor panels generally equal in spacing to a vertical thickness of said tow bar and rearwardly diverging side panels, the rearward edges of said top, floor and side panels defining an elongated generally rectangular opening from which said tow bar rearwardly extends, said throat having an elongated tubular throat extension having straight side panels coaxially forwardly extending from said throat in the longitudinal direction and adapted for rigid connection to a vehicle;
   said tow bar sized to be slidably carried and held from substantial axial rotation or vertical movement within said throat assembly;
   an elongated longitudinally extending substantially cylindrical slide bar carried for slidable movement between said tow bar assembly and said throat assembly, said slide bar including an enlarged stop at each end thereof which limits the distance said tow bar assembly may be extended rearwardly from said throat assembly to a fully extended position;

said elongated slide bar being rigidly connected at said forward end of said tow bar assembly and slidably extending through a guide stop which is rigidly connected to said throat;

said tow bar assembly, when in the fully or a partially extended position, being pivotally movable laterally side-to-side between said top and floor panels against one said side panel to facilitate a proper coupling alignment between the hitch ball and a hitch coupling of a trailer;

a removable or releasable locking pin insertable through aligned holes in said tow bar assembly and said throat assembly to secure said tow bar assembly fully within and coaxially aligned with said throat assembly.

2. A trailer hitch as set forth in claim 1, further comprising:

a spring-biased latch carried on said throat assembly which automatically engages between aligned apertures in said throat and said tow bar when said tow bar is fully inserted into said throat.

3. A trailer hitch comprising:

a tow bar assembly including an elongated tow bar rectangular in cross section and a hitch ball support disposed at a rearward end thereof, said tow bar also having straight side panels which taper inwardly at a forwardly end thereof;

a throat including spaced parallel top and floor panels generally equal in spacing to a vertical thickness of said tow bar and rearwardly diverging side panels, the rearward edges of said top, floor and side panels defining an elongated generally rectangular opening from which said tow bar extends, said throat having a forwardly facing open end adapted for rigid connection to a rearward facing open end of a tubular receiver of a trailer hitch frame attached to the rear of a vehicle the tubular receiver having straight side panels;

said tow bar sized to be slidably carried within, and held from substantial axial rotation or vertical movement by said throat and extending into the receiver;

an elongated longitudinally extending substantially cylindrical slide bar carried adjacent said tow bar for slidable movement between said tow bar and said throat, said throat including an enlarged stop at each end thereof which limits the distance said tow bar assembly may be extended rearwardly from said throat assembly to a fully extended position;

said elongated slide bar being rigidly connected at said forward end of said tow bar assembly and slidably extending through a guide stop which is rigidly connected to said throat;

said tow bar assembly, when in the fully or a partially extended position, being pivotally movable laterally side-to-side between said top and floor panels and against one said side panel to facilitate a proper coupling alignment between the hitch ball and a hitch coupling of a trailer;

a removable or releasable locking pin insertable through aligned holes in said tow bar assembly and the receiver to secure said tow bar assembly fully within and coaxially aligned with said throat and the receiver.

4. A trailer hitch as set forth in claim 3, further comprising:

a spring-biased latch carried on the receiver which automatically engages between aligned apertures in the receiver and said tow bar when said tow bar is fully inserted into the receiver.

5. A trailer hitch comprising:

a tow bar assembly including an elongated tow bar rectangular in cross section and a hitch ball support disposed at a rearward end thereof, said tow bar also having straight side panels which taper inwardly at a forwardly end thereof;

a throat assembly including a throat having spaced parallel top and floor panels generally equal in spacing to a vertical thickness of said tow bar and rearwardly diverging side panels, the rearward edges of said top, floor and side panels defining an elongated generally rectangular opening from which said tow bar extends, said throat connected or connectable to an elongated tubular extension or receiver having straight parallel side panels coaxially forwardly extending from said throat in a longitudinal direction, the extension or receiver being connected or adapted for rigid connection to a rear frame cross member of a vehicle;

said tow bar sized to be slidably carried within, and held from substantial axial rotation or vertical movement by said throat assembly;

an elongated substantially cylindrical longitudinally extending slide bar carried adjacent or within said tow bar for slidable movement between said tow bar assembly and said throat assembly, said slide bar including an enlarged stop at each end thereof which limits the distance said tow bar assembly may be extended rearwardly from said throat assembly to a fully extended position;

said elongated slide bar being rigidly connected at said forward end of said tow bar assembly and slidably extending through a guide stop which is rigidly connected to said throat;

said tow bar assembly, when in the fully or a partially extended position, being pivotally movable laterally side-to-side between said top and floor panels and against one said side panel to facilitate a proper coupling alignment between the hitch ball and a hitch coupling of a trailer;

a removable or releasable locking pin insertable through aligned holes in said tow bar assembly and said throat assembly to secure said tow bar assembly fully within and coaxially aligned with said throat assembly.

6. A trailer hitch as set forth in claim 5, further comprising:

a spring-biased latch carried on said extension or receiver which automatically engages between aligned apertures in said extension or receiver and said tow bar when said tow bar is fully inserted into said extension or receiver.

* * * * *